Feb. 4, 1958     J. B. BAKER     2,822,224
BEARING THRUST CUSHIONING MEANS

Filed Aug. 15, 1955     2 Sheets-Sheet 1

INVENTOR
JOHN B. BAKER
By Gravely, Lieder, Woodruff and Wills
ATTORNEYS.

Feb. 4, 1958 J. B. BAKER 2,822,224
BEARING THRUST CUSHIONING MEANS
Filed Aug. 15, 1955 2 Sheets-Sheet 2

INVENTOR
JOHN B. BAKER
BY Gravely, Lieder, Woodruff and Wiles
ATTORNEYS

United States Patent Office 2,822,224
Patented Feb. 4, 1958

2,822,224

BEARING THRUST CUSHIONING MEANS

John B. Baker, Canton, Ohio, assignor to The Timken Roller Bearing Company, Canton, Ohio, a corporation of Ohio Application August 15, 1955, Serial No. 528,347

18 Claims. (Cl. 308—180)

The present invention relates to bearing thrust cushioning means and particularly to bearing thrust cushioning means for use on freight vehicles such as railroad cars. More particularly, the invention relates to bearing thrust cushioning means provided with a pressure fluid system for cushioning the effects of bearing end thrust.

A principal object of the present invention is to provide a bearing assembly for a journal box having pressure fluid means for cushioning the bearing displacement due to end thrust.

Another object of the invention is to provide a bearing assembly for a journal box that may be adjusted to dampen the effects of varying amounts of end thrust.

Another object of the present invention is to provide a bearing assembly for a journal box that will dampen bearing movement due to end thrust in either direction.

Another object of the invention is to provide a relatively inexpensive bearing assembly for a juornal box that controls bearing movement due to end thrust and which does not interfere with the normal functions of the bearing assembly.

These and other objects and advantages will become apparent hereinafter.

Briefly, the present device includes a bearing assembly equipped with a pressure fluid system for resisting axial movement of the bearing members due to end thrust.

Figure 1:
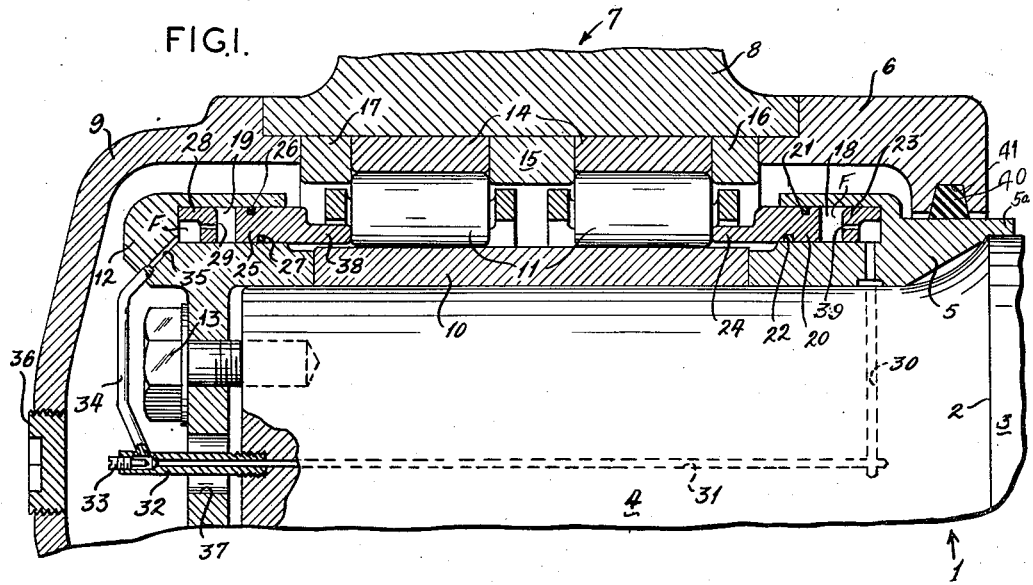
Figure 3:
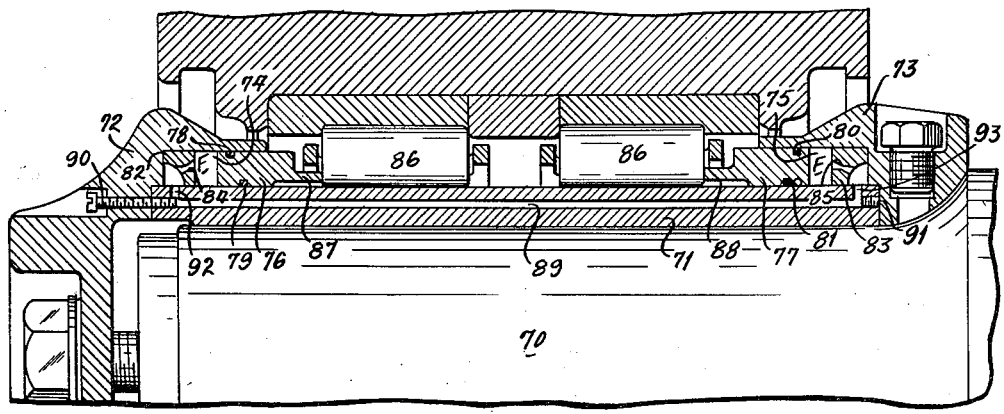
Figure 2:
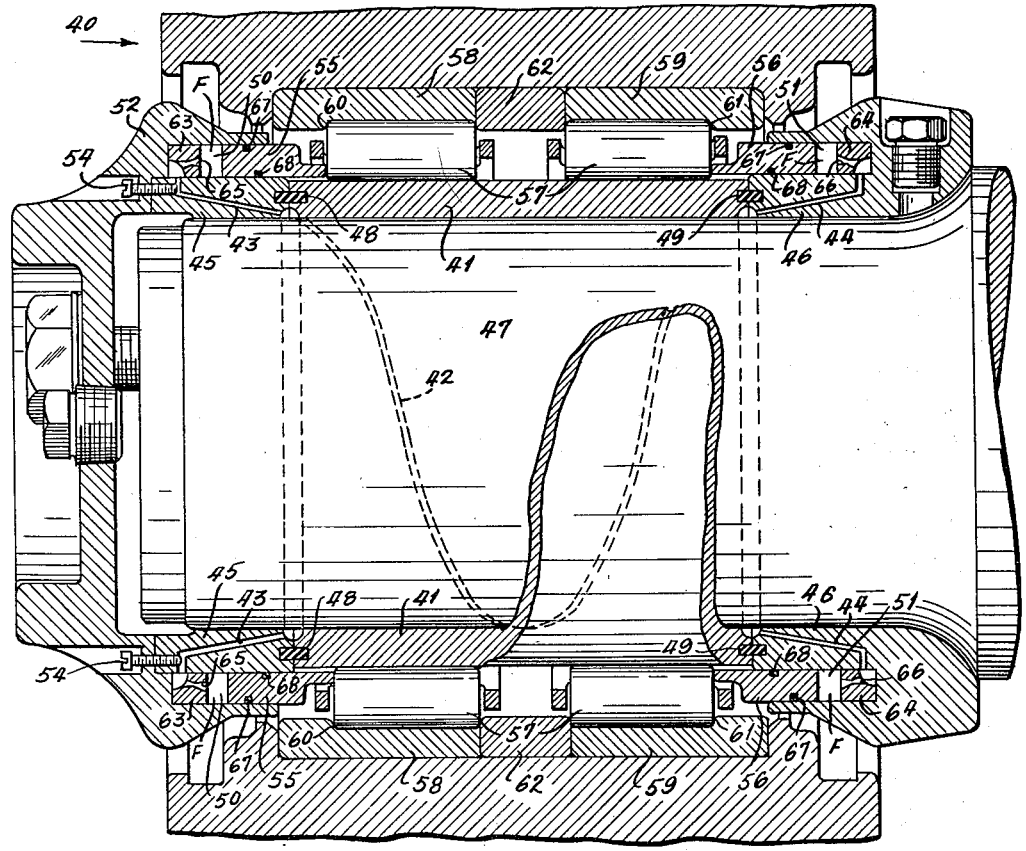

Fig. 1 is a fragmentary cross-sectional view of a journal box including a bearing assembly incorporating the teachings of the present invention, Fig. 2 is a fragmentary cross-sectional view of a journal box incorporating a variation of the bearing assembly in Fig. 1, and Fig. 3 is a fragmentary cross-sectional view of a journal box incorporating another variation of the bearing assembly of Fig. 1.

Referring to the drawings in detail the number 1 (Fig. 1) refers to an axle on a freight vehicle such as found on a railroad car. The axle 1 is provided with a shoulder 2 which defines the inner boundary of the axle journal 4. An annular spacer member or backing ring 5 is fitted onto the axle journal 4 and has an annular flange 5a that extends past the shoulder 2 and onto a larger central portion 3 of the axle 1. The spacer member 5 is spaced from a central closure 6 which is a part of the overall housing for a journal box 7. The central closure 6 is connected to a housing member 8 which extends endwardly in circumscribing relation about the axle journal 4 and has one end connected to a journal box end cover 9. A sealing member 40 is positioned in an annular groove 41 in the central closure 6 and extends therefrom to slidably engage the spacer member 5 as shown.

Fitted to the axle journal 4 is a tubular shaped inner race ring 10 for a double row of anti-friction bearing rollers 11. One end of the inner race ring 10 abuts an endwise facing portion of the inner spacer member 5, and the other end abuts an oppositely facing wall on an axle end cap 12. The end cap 12 is secured to the axle journal 4 by bolts 13, which when drawn up, abut the end cap 12 with inner race ring 10 as shown.

Between the outer surfaces of the bearing rollers 11 and the housing member 8, and extending between oppositely facing surfaces on the inner closure 6 and the end cover 9, are separate outer bearing race rings 14. The race rings 14 are separated from each other by an annular spacer 15 and from the inner closure 6 and end cover 9 by spacers 16 and 17 respectively. The spacers 15, 16 and 17 have portions that extend inwardly further than the outer race rings 14 and that serve to engage the ends of the bearing rollers 11. The inwardly extending portions act as thrust surfaces and are provided with running clearance with the bearing rollers 11.

The annular inner spacer member or backing ring 5 and the axle end cap 12 are provided with oppositely facing annular chambers 18 and 19 respectively. The chambers 18 and 19 are substantially in alignment axially with the bearing rollers 11 at the opposite ends thereof. An annular piston member or thrust ring 20 is slidably positioned in the chamber 18 and carries sealing members or piston rings 21 and 22. To the right of the piston member 20, at the seat of the chamber 18, is a hydraulic chamber stop element 23 that has a passage or orifice 39 therethrough. Between the piston member 20 and the stop element 23 in the chamber 18 is a reservoir containing hydraulic fluid F.

The piston member 20 has an annular shaped projecting ring 24 extending to the left out of the chamber 18. The projecting ring 24 is integral with the piston member 20 and abuts the right end surfaces of the bearing rollers 11 in the nearest row.

A thrust ring or piston member 25, similar in shape to the piston member 20, is slidably positioned in the chamber 19 but is disposed therein to abut oppositely facing surfaces on the bearing rolls 11. The piston member 25 is provided with sealing members of piston rings 26 and 27 that engage the walls of the chamber 19, and has projecting ring 38 that abuts the left ends of the bearing rollers 11. To the left of the piston member 25 at the base of the chamber 19 is a hydraulic chamber stop element 28 with an orifice or passage 29 therethrough. A reservoir for hydraulic fluid F is formed between the stop element 28 and the piston member 25 in the chamber 19.

Extending frome the base of chamber 18 is a passage 30 that passes through the inner spacer 5 and extends to a depth midway through the axle journal 4. At its depth, the passage 30 intersects another axial passage 31 that extends to the left through the end of the axle journal 4.

A valve or metering device is provided in the axial passage 31 to regulate fluid flow between the chambers 18 and 19. The valve includes a tubular valve member 32 which is threaded externally at its right end to screw into a cooperating bore in the axle 4 and which is threaded internally at its left end (Fig. 1) to receive an adjustable metering member 33. The member 33 is adjustable between a fully open position (to the left) and a fully closed position in which it cooperates with a valve seat (not numbered) to restrict fluid flow between the chambers 18 and 19. Also connected to the valve member 32 near its left end is a conduit 34 that has its other end connected to a passage 35 in the axle end cap 12 and which extends into the seat of the chamber 19. A removable access plug 36 is provided in the journal box end cover 9 and permits access to the metering control member 33 for making adjustments thereof. A bore 37 in the axle end cap 12 conveniently exposes the valve member 32 as far as the end of the axle journal 4.

In operation, the chambers 18 and 19 and the connecting passages 30, 31, valve member 32, conduit 34 and passage 35 are filled with hydraulic fluid F. Sufficient running clearance must be allowed so that the projections 24 and 38 do not bind or load the bearing rollers 11 during normal operation. However, when end thrust is encountered and the inwardly projecting portions of the spacers 15, 16 and 17 engage the ends of the bearing rollers 11, the rollers 11 move against the oppositely disposed projection 24 or 38 depending on the direction of the end thrust.

The valve member 32 and the metering control member 33 provide a convenient method for restricting fluid flow between the chambers 18 and 19 to any desired extent by merely varying the size of the opening or constriction formed therebetween. By restricting fluid flow through the valve member 32 with the metering member 33 the speed of movement of the bearing rollers 11 relative to the axle journal 4 can be controlled.

One advantage that the present bearing assembly has over prior bearing assemblies is its ability to restrict or dampen axial bearing movement in both directions by fluid pressure. For example, if during movement of a freight vehicle, such as a railroad box car, along a track, an end thrust is placed on the journal box by the momentum of the box car rounding a turn; there will be a thrust force exerted by the spacers 15, 16 and 17 on the bearing rollers 11 to move the rollers axially relative to the inner race ring 10. If the direction of the thrust force is such that the bearing rollers 11 attempt to move to the left, they will exert a force on the piston member 25 which will simultaneously exert a force on the fluid F to the left in chamber 19. The fluid F will move out of the reservoir formed by the chamber 19 and the piston member 25 through the conduit 34, past the valve member 32, and into chamber 18 by way of conduits 31 and 30. The amount of force necessary to move the piston 25 to the left in the manner described depends on how rapidly the fluid F can move from the chamber 19 to the chamber 18. This in turn depends on the setting of the metering control member 33 which is threaded and adjustable for varying the fluid opening in the valve member 32. For a small opening greater end thrust is required to move the thrust ring 25 than for a larger opening. A similar result is produced if the bearing rollers 11 attempt to move to the right, except, the fluid F will flow from right to left instead of from left to right.

Fig. 2 shows a bearing assembly in a journal box 40 having many of the same characteristics as that described for Fig. 1. The construction of the bearing assembly and journal box 40, however, has been changed in order to illustrate a variation of the bearing thrust cushioning means above described. In Fig. 2 an inner race ring 41 is provided with a helical groove 42 that extends around the inner wall thereof between opposite ends. The ends of the helical groove 42 connect with passages 43 and 44 in an annular sleeve member 45 and a backing ring 46 respectively. The sleeve member 45 and backing ring 46 are fitted to an axle journal 47 at opposite ends of the inner race ring 41 and they are sealed to the race ring 41 by annular sealing rings 48 and 49 respectively.

The sleeve member 45 provides one wall of a chamber 50, and the other walls of the chamber 50 are on an axle end cap 52. The backing ring or inner closure member 46 is provided with another chamber 51. The chambers 50 and 51 correspond to the chambers 19 and 18 respectively in Fig. 1. A meter control device 54, shown as a screw extending through the end cap 52 into the member 45, is threadedly adjustable for obtaining the desired fluid constriction in the passage 43.

Piston members or thrust rings 55 and 56 are slidably positioned in the chambers 50 and 51 respectively and engage opposite ends of bearing rollers 57 for dampening the bearing end thrust in the same manner as was described with Fig. 1. The main difference between the constructions shown in Figs. 1 and 2 is that in Fig. 2 the need for boring into the axle journal 47 is eliminated.

The piston members 55 and 56 are shown engaged with the opposite ends of the anti-friction bearing rollers 57 located in parallel rows about the inner race ring 41. The bearing rollers 57 are engaged on their outer sides with separate outer race rings 58 and 59 that are shown having shoulders 60 and 61 respectively for abutting opposite ends of the rollers 57. An annular spacer 62 is provided between the outer race rings 58 and 59 and the rows of rollers 57. Chamber stop elements 63 and 64 having orifices or passages 65 and 66 respectively therethrough are provided at the seat of each of the chambers 50 and 51 respectively. The piston members each carry sealing members 67 and 68 that engage the walls of the chambers 50 and 51.

The bearing assembly and journal box of Fig. 2 operates the same as that considered for Fig. 1 except that the fluid F takes a helical route along the groove 42 between the chambers 50 and 51 instead of passing through the axle journal itself. For illustrative purposes Fig. 2 includes positions for two of the metering devices 54. However, it is anticipated that only one is needed but that any number could be used.

Fig. 3 shows another variation of the bearing assembly and journal box of Fig. 1. An axle journal 70 carries a tubular inner race ring 71. The outer wall of the inner race ring 71, in combination with a bearing end cap 72 and an inner closure member or backing ring 73, form two annular chambers 74 and 75 which slidably receive piston members or thrust rings 76 and 77 respectively. The piston member 76 carries sealing members or piston rings 78 and 79, and the piston member 77 carries sealing members or piston rings 80 and 81. Chamber stop elements 82 and 83, having orifices 84 and 85 respectively, are positioned at the seats of the chambers 74 and 75. Between the piston members 76 and 77 and the seats of the respective chambers 74 and 75 are reservoirs for fluid F.

Engaging the outer surface of the inner race ring 71 between the piston members 76 and 77 are bearing rollers 86 arranged in two parallel rows. Opposite sides of the parallel rows are operatively engageable by projections 87 and 88 on the piston members 76 and 77.

Connecting the reservoirs formed in the chambers 74 and 75 is a passage 89 which extends through the inner race ring 71 parallel to the axle journal 70. The left end of the passage 89 is threadedly provided with a metering device 90 which is shown illustratively as a screw. The right end of the passage 89 is plugged by plug 91. Extending outwardly from the passage 89 through the inner race ring 71 are passages 92 and 93 which connect passage 89 with the chambers 74 and 75 respectively. The passages 89, 92, 93 and the chambers 74 and 75 are filled with fluid F sufficient to permit running clearance between the projections 87 and 88 and the ends of the bearing rollers 86. By adjustment of metering device 90 the fluid flow between chambers 74 and 75 can be restricted to dampen bearing end thrust. The bearing assembly of Fig. 3 operates in the same manner as the bearing assemblies shown in Figs. 1 and 2 except that the fluid F takes a different path between the chambers 74 and 75.

In all of the drawings two parallel rows of bearing rollers have been shown. It is anticipated that one row or any number of rows could be used without departing from the spirit of the invention.

The construction, arrangement and relationship of the elements may be varied within the range of equivalent elements without departing from the nature and spirit of the invention.

What I claim is:

1. In a bearing structure; a housing; a journal in said housing; an anti-friction bearing having an outer race mounted in the housing, an inner race mounted on said journal, and rollers movably positioned therebetween so that the outer race can move axially relative to the inner race; means at opposite ends of said rollers forming a chamber, a slidably positioned thrust member in each chamber disposed to engage the opposite ends of said rollers; passage means connected between said chambers to place said chambers in fluid flow communication for the interchange of fluid upon axial movement of said rollers relative to the inner race; and flow metering means in said passage means to regulate the rate of fluid flow therein and to dampen said relative axial movement.

2. In a bearing structure; a housing; a journal in said housing; an anti-friction bearing having an outer race mounted in the housing, an inner race mounted on said journal, and cylindrical rollers movably positioned therebetween so that the outer race and the rollers can move axially relative to the inner race; means at opposite ends of said rollers forming a chamber, a slidably positioned thrust member in each chamber disposed to engage the opposite ends of said cylindrical rollers; passage means connected between said chambers to place said chambers in fluid flow communication for the interchange of fluid upon axial movement of said rollers relative to the inner race; and adjustable flow metering means in said passage means to regulate the rate of fluid flow therein and to dampen said relative axial movement.

3. In a bearing structure; a housing; a journal in said housing; an anti-friction bearing having an outer race mounted in the housing, an inner race mounted on said journal, and cylindrical bearing rollers movably positioned therebetween so that the outer race and the rollers can move axially relative to the inner race; means at opposite ends of said rollers forming a chamber, a slidably positioned thrust ring in each chamber disposed to engage the opposite ends of said cylindrical bearing rollers; passage means connected between said chambers to place said chambers in fluid flow communication for the interchange of fluid upon axial movement of said rollers relative to the inner race; and controlled flow metering means in said passage means to regulate the rate of fluid flow therein and to dampen said relative axial movement.

4. In a bearing structure; a housing; a journal in said housing; an anti-friction bearing having an outer race mounted in the housing, an inner race mounted on said journal, and cylindrical bearing rollers movably positioned therebetween so that the outer race and the bearing rollers can move axially relative to the inner race; means at opposite ends of said rollers forming a chamber, a slidably positioned thrust ring in each chamber disposed to engage the opposite ends of said cylindrical bearing rollers; passage means connected between said chambers to place said chambers in fluid flow communication for the interchange of fluid upon axial movement of said rollers relative to the inner race; and flow metering means in said passage means to regulate the rate of fluid displacement between said chambers and to dampen said relative axial movement.

5. In a bearing structure; a housing; a journal in said housing; an anti-friction bearing having an outer race mounted in the housing, an inner race mounted on said journal, and at least one row of cylindrical bearing rollers movably positioned between said race in circumscribing relation about said journal and capable of movement axially relative to the inner race; means at opposite ends of said rollers forming chambers disposed to face the opposite ends of said row of bearing rollers; piston members slidably positioned in said chambers and extending therefrom into free running engagement with the opposite ends of said bearing rollers; passage means encircling said journal connected between said chambers to place said chambers in fluid flow communication for the interchange of fluid upon axial movement of said rollers relative to the inner race; and passage constricting means in said passage means between said chambers to regulate the fluid flow therein and to dampen the relative axial movement of said rollers relative to said inner race.

6. A bearing assembly for a rotary member comprising a bearing for a rotary member including an inner race for receiving the rotary member, an outer race, and relatively movable anti-friction members therebetween; said rotary member having annular chambers therein disposed to face opposite ends of said anti-friction members, pistons slidably positioned in said chambers and extending therefrom to provide running clearance with the opposite ends of said anti-friction members, said pistons and said chambers forming fluid reservoirs on opposite sides of said anti-friction members; passage means connected between said chambers to place said chambers in fluid flow communication for the interchange of fluid therebetween upon axial movement of said anti-friction members relative to said inner race; and passage constricting means in said passage means between the chambers for regulating the fluid flow therein and to dampen said relative axial movement.

7. The bearing assembly for a rotary member set out in claim 6 wherein said passage means is in said rotary member.

8. The bearing assembly for a rotary member set out in claim 6 wherein said passage means is in said inner race.

9. The bearing assembly for a rotary member set out in claim 6 wherein said passage constricting means includes a member threadedly positioned in said passage means.

10. In a bearing assembly for a journal structure; a housing; a journal in said housing; an anti-friction bearing including an outer race mounted in the housing, an inner race for reception of said journal, and bearing rollers movably positioned between said inner and outer races so that the races and rollers are capable of axial movement relative to each other; said journal having annular chambers therein disposed to face opposite ends of the bearing rollers; thrust rings in said journal chambers including means for sealing the thrust rings to the chamber to form sealed reservoirs therewith, said thrust rings extending from said chambers and having running clearance only to opposite ends of said bearing rollers; passage means connected between said chambers for placing said chambers in fluid flow communication for the interchange of fluid upon displacement of said bearing rollers axially relative to the inner race, and fluid flow restricting means in said passage means to regulate the fluid interchange between said chambers and to dampen said relative axial movement.

11. In a bearing assembly for a journal structure, a housing, an anti-friction bearing having an outer race mounted in the housing and separated from an inner race that receives a journal structure by a row of bearing members, said races and said bearing members being movable axially relative to each other, said journal structure including annular chambers disposed to slidably receive thrust members that extend therefrom toward oppositely facing ends of said bearing members, said thrust members being positioned in said chambers to form reservoirs therewith, and passage means in said journal structure connected to said chambers to place said chambers in fluid flow communication with each other, said chambers and passage means containing fluid movable between said chambers through the passage means in response to relative axial movement of the bearing members and the inner race.

12. The bearing assembly for a journal structure of claim 11 wherein said passage means includes a bore in said journal.

13. The bearing assembly for a journal structure set out in claim 11 wherein said passage means includes a helical groove in said inner race between the ends thereof.

14. The bearing assembly for a journal structure of claim 11 wherein said passage means includes an axial bore in said inner race.

15. The bearing assembly for a journal structure of claim 11 wherein said passage means includes a passage constriction for restricting the flow of fluid therethrough.

16. The bearing assembly for a journal structure of claim 15 wherein said passage constriction includes a threaded member positioned in said passage means.

17. In a bearing structure; a housing; a journal in said housing; an anti-friction bearing having an outer race mounted in the housing, an inner race mounted on said journal, and bearing rollers movably positioned therebetween so that the outer race and the rollers can move axially relative to the inner race; means at opposite ends of said rollers forming a chamber, a slidably positioned thrust ring in each chamber disposed to operatively engage the opposite ends of said cylindrical bearing rollers, said thrust rings and said bearing rollers being loosely engaged to provide running clearance therebetween; passage means connected between said chambers to place said chambers in fluid flow communication for the interchange of fluid upon axial movement of said rollers relative to the inner race; and flow metering means in said passage means to regulate the fluid flow therein and to dampen said relative axial movement.

18. In the bearing structure of claim 17 the flow metering means in said passage means includes an adjustable fluid flow control element for dampening said relative axial movement.

References Cited in the file of this patent

UNITED STATES PATENTS

| 1,457,328 | Van Berkel | June 5, 1923 |
| 2,703,738 | Palmgren et al. | Mar. 8, 1955 |

FOREIGN PATENTS

| 151,698 | Australia | June 3, 1953 |
| 715,982 | Great Britain | Sept. 22, 1954 |